United States Patent
McKoskey (10) Patent No.: US 7,854,290 B1
(45) Date of Patent: Dec. 21, 2010

(54) ATV WITH DUAL SILENCERS

(75) Inventor: George Jay McKoskey, Forest Lake, MN (US)

(73) Assignee: Polaris Industries Inc., Medina, MN (US)

( * ) Notice: Subject to any disclaimer, the term of this patent is extended or adjusted under 35 U.S.C. 154(b) by 1021 days.

(21) Appl. No.: 11/153,965

(22) Filed: Jun. 16, 2005

(51) Int. Cl.
*B60K 13/04* (2006.01)

(52) U.S. Cl. .................... 180/309; 180/69.22

(58) Field of Classification Search ............ 180/309, 180/69.22, 89.2; 181/232
See application file for complete search history.

(56) References Cited

U.S. PATENT DOCUMENTS

| | | | | |
|---|---|---|---|---|
| 3,653,212 | A | * 4/1972 | Gast et al. | 60/293 |
| 3,739,873 | A | 6/1973 | Shaughnessy | 181/36 B |
| 3,889,772 | A | 6/1975 | Kelley | 180/64 A |
| 3,972,384 | A | * 8/1976 | Hoefs | 181/232 |
| 4,354,349 | A | 10/1982 | Otani et al. | 60/299 |
| 4,884,399 | A | 12/1989 | Morris | 60/313 |
| 5,388,408 | A | 2/1995 | Lawrence | 60/324 |
| 5,542,387 | A | * 8/1996 | Okubo | 123/192.2 |
| 5,575,352 | A | * 11/1996 | Suzuki et al. | 180/311 |
| 5,882,236 | A | 3/1999 | Ozawa et al. | 440/89 |
| 6,141,958 | A | * 11/2000 | Voss | 60/272 |
| 6,283,162 | B1 | 9/2001 | Butler | 138/177 |
| 6,334,501 | B1 | * 1/2002 | Kawamoto | 180/309 |
| 6,626,260 | B2 | * 9/2003 | Gagnon et al. | 180/291 |
| 6,651,773 | B1 | 11/2003 | Maarocco | 181/270 |
| 6,773,317 | B2 | 8/2004 | Dagenais et al. | 440/89 E |
| 6,804,955 | B2 | 10/2004 | Bassani | 60/313 |
| 2004/0035623 | A1 | 2/2004 | Fecteau et al. | 180/210 |
| 2004/0050618 | A1 | 3/2004 | Marocco | 181/248 |

FOREIGN PATENT DOCUMENTS

| | | |
|---|---|---|
| JP | 56023509 | 3/1981 |
| JP | 57030616 A * | 2/1982 |

OTHER PUBLICATIONS

DMC Alien line of exhaust systems [online] [retrieved on Mar. 4, 2005] Retrieved from http://www.dmc-on-line.com/index2.html.
Yamaha [online] [retrieved on Mar. 4, 2005] Retrieved from http://www.yamaha-motor.com/products/unitinfo/1/atv/1/2/0/Yamaha_banshee.aspx.
MBRP ATV Systems [online] [retrieved on Mar. 4, 2005] Retrieved from http://www.mbrp.com/atv.
214 Racing ATV Wheels and Tires, Shocks, A-Arms, Swing Arms and Exhaust [online] [retrieved on Mar. 4, 2005] Retrieved from http://www.214racing.com/shop/index.php?manufacturers_id=25.

* cited by examiner

*Primary Examiner*—S. Joseph Morano
*Assistant Examiner*—Bridget Avery
(74) *Attorney, Agent, or Firm*—Baker & Daniels LLP (57) ABSTRACT

In some embodiments, a vehicle having multiple silencers may include one or more of the following features: (a) a chassis carrying a seat, (b) a steerable pair of front wheels and at least two rear wheels coupled to the chassis, (c) a steering member for steering the front wheels, (d) an engine carried by the chassis for powering the vehicle, (e) at least one exhaust manifold operably coupled to the engine, (f) at least one exhaust pipe coupled at one end to said at least two exhaust manifolds, (g) a first silencer coupled to the other end of said one or more exhaust pipes, (h) a second silencer coupled to the first silencer to route exhaust through the length of each silencer, and (i) a crossover tube which couples the first silencer to the second silencer.

10 Claims, 14 Drawing Sheets

ATV WITH DUAL SILENCERS

FIELD

This invention relates to exhaust systems for internal combustion engines and, more particularly, to an exhaust system, which attenuates exhaust sounds while managing exhaust pressure waves to enhance engine performance.

BACKGROUND

The four stroke internal combustion engine is basically a pump. It must pump an air and fuel mixture in and pump the burned exhaust out. In order to increase engine efficiency and torque steps can be taken to enhance the pumping characteristics of the engine. One of the areas of engine tuning that helps in this regard is the exhaust system.

When the exhaust valve first opens, referred to as blowdown, the pressure remaining from the power stroke is released into the exhaust system. The resulting high-pressure wave travels down the system at the local speed of sound in the range of 600 meters per second. That speed depends upon engine and exhaust system design. Waves traveling through ducts will reflect back up the duct in the opposite direction whenever there is a change in cross sectional area of the duct. If the area is increasing then the wave will reflect as a negative of the original wave. A high-pressure wave will reflect a low pressure or rarefaction wave in such a case. If the area is reducing then the wave reflected is same sign as the original, which means that a pressure wave will reflect another pressure wave.

These waves moving back and forth present the opportunity to use them for improved engine performance. In particular there is a period in the engine's cycle when it is useful to have a rarefaction wave present at the exhaust valve. This period is during the exhaust stroke and the top dead center period between the exhaust stroke and intake stroke. A low pressure at the exhaust valve during this time assists in the exhaust process and can result in reduced residual exhaust in the combustion chamber to dilute the incoming air.

SUMMARY

In some embodiments, a vehicle having multiple silencers may include one or more of the following features: (a) a chassis carrying a seat, (b) a steerable pair of front wheels and at least two rear wheels coupled to the chassis, (c) a steering member for steering the front wheels, (d) an engine carried by the chassis for powering the vehicle, (e) at least one exhaust manifold operably coupled to the engine, (f) at least one exhaust pipe coupled at one end to said at least two exhaust manifolds, (g) a first silencer coupled to the other end of said one or more exhaust pipes, (h) a second silencer coupled to the first silencer to route exhaust through the length of each silencer, and (i) a crossover tube which couples the first silencer to the second silencer.

In some embodiments, an ATV having multiple silencers may include one or more of the following features: (a) a chassis carrying a saddle seat, (b) right and left outboard front wheels and right and left outboard rear wheels coupled to the chassis, (c) a steering member for steering the front wheels, (d) an engine carried by the chassis for powering the vehicle, (e) an exhaust manifold operably coupled to the engine, (f) at least one exhaust pipe coupled at one end to said exhaust manifold, (g) a first silencer coupled to the other end of said one or more exhaust pipes, (h) a second silencer coupled to the first silencer at an intake portion of the first and second silencers providing parallel routes of travel for engine exhaust gas, and (i) a crossover tube which couples the first silencer to the second silencer.

In some embodiments, a vehicle having multiple silencers may include one or more of the following features: (a) a chassis carrying a saddle seat, (b) right and left outboard front wheels and right and left outboard rear wheels coupled to the chassis, (c) a steering member for steering the front wheels, (d) an engine carried by the chassis for powering the vehicle, (e) an exhaust manifold operably coupled to the engine, (f) at least one exhaust pipe coupled at one end to said exhaust manifold, (g) a first silencer coupled to the other end of the exhaust pipe, and (h) a second silencer coupled at a rear portion to the first silencer at an intake portion by a crossover tube.

DESCRIPTION OF VARIOUS EMBODIMENTS

The following discussion is presented to enable a person skilled in the art to make and use embodiments of the invention. Various modifications to the illustrated embodiments will be readily apparent to those skilled in the art, and the generic principles herein may be applied to other embodiments and applications without departing from embodiments of the invention. Thus, embodiments of the invention are not intended to be limited to embodiments shown, but are to be accorded the widest scope consistent with the principles and features disclosed herein. The following detailed description is to be read with reference to the figures, in which like elements in different figures have like reference numerals. The figures, which are not necessarily to scale, depict selected embodiments and are not intended to limit the scope of embodiments of the invention. Skilled artisans will recognize the examples provided herein have many useful alternatives and fall within the scope of embodiments of the invention. The following introductory material is intended to familiarize the reader with the general nature and some of the features of embodiments of the invention.

Figure 1A:
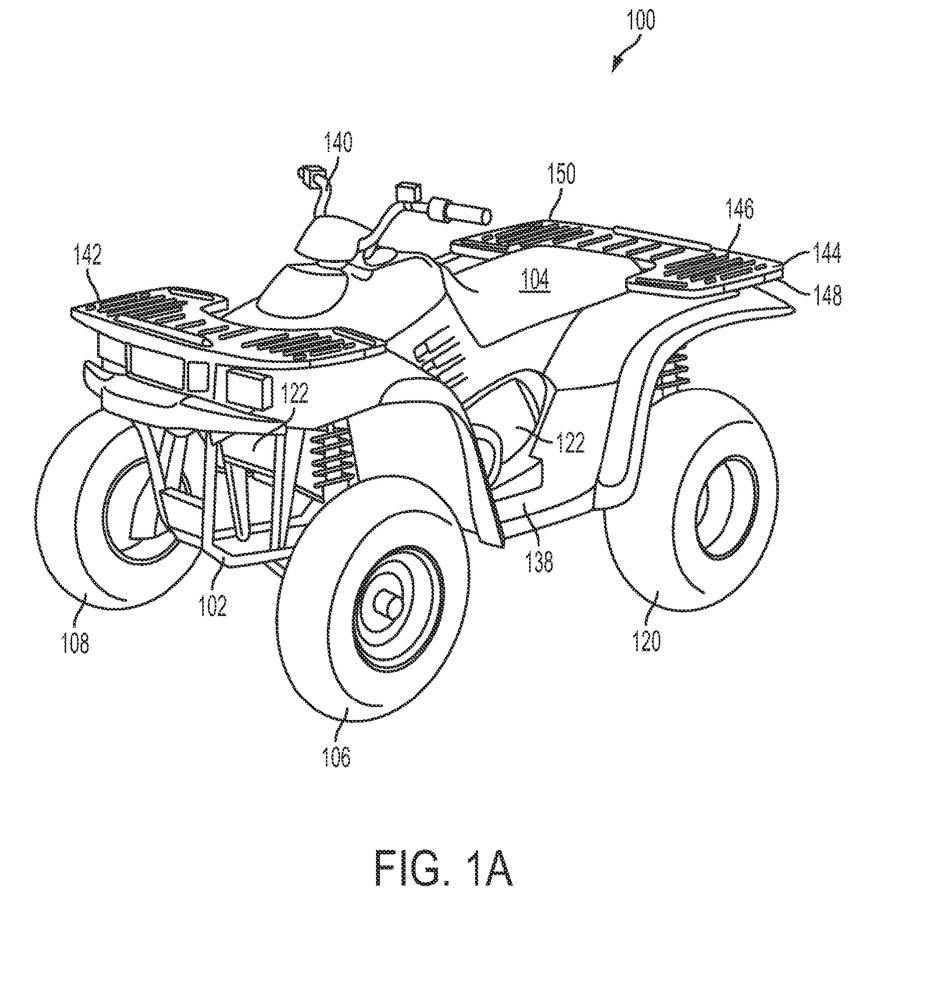
FIG. 1A shows a perspective view of an ATV in an embodiment of the present teachings.
Figure 1C:
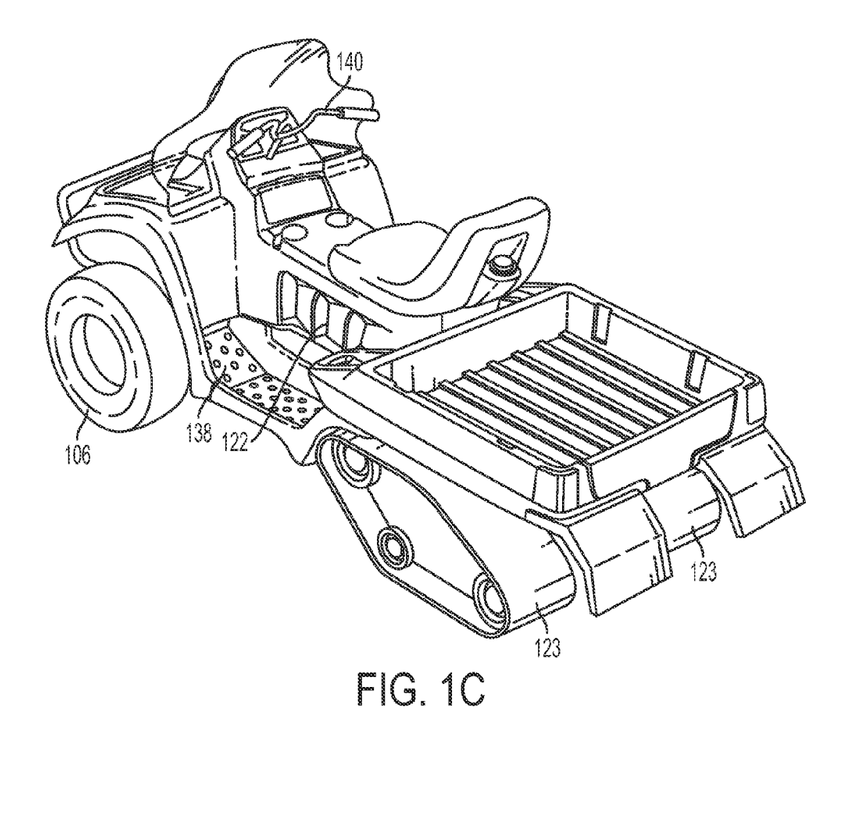
FIG. 1C shows a side profile view of an ATV in an embodiment of the present teachings.
Figure 2:
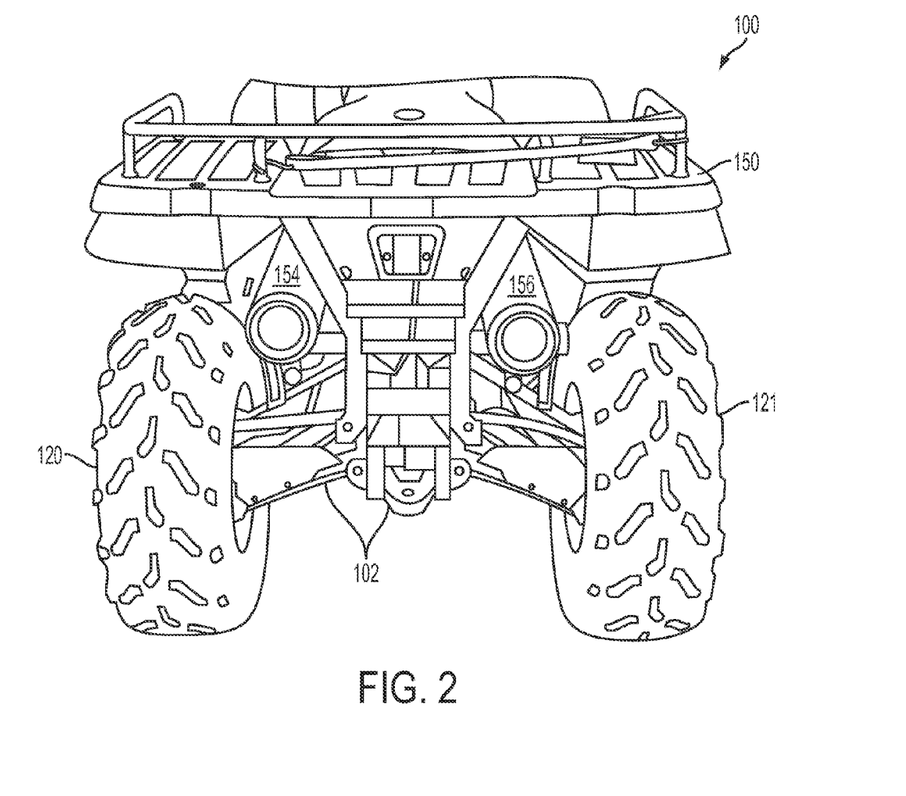
FIG. 2 shows a rear perspective view of an ATV having dual silencers in an embodiment of the present teachings.

FIG. 1A is a perspective view of a vehicle 100 in accordance with an exemplary embodiment of the present teachings. Vehicle 100 of FIG. 1A can be generally referred to as an ATV. Vehicle 100 can have a chassis 102 carrying a straddle type seat 104. In FIG. 1A, straddle type seat 104 is sufficiently narrow to be straddled by a vehicle rider. Vehicle 100 can have a left front wheel 106, a right front wheel 108, a left rear wheel 120, and right rear wheel 121 (FIG. 2). In some embodiments, vehicle 100 could have tracks 123 as shown in FIG. 1C. Vehicle 100 can also include an engine 122 that is carried by chassis 102. Engine 122 can be coupled to at least some wheels of vehicle 100 via a drive train for propelling vehicle 100. Engine 122 can be used to power each rear wheel 120 and 121, and in some cases also each front wheel 106 and 108. It is fully contemplated other devices such as a motor could be used to power vehicle 100 without departing from the spirit of the present teachings.

Vehicle 100 can also include a first footrest 138 that can be seen extending from one side of the chassis 102 in FIG. 1A. Vehicle 100 can also include a second footrest (not shown in FIG. 1A) that extends from the other side of chassis 102. Vehicle 100 also includes member 140 that may be used for steering vehicle 100. In FIG. 1A, steering member 140 comprises a handlebar. Vehicle 100 can also include at least one mounting aperture 150. For example, mounting aperture 150 can be located on accessory platforms 142 and 144 often referred to as racks. Accessory platforms 142 and 144 can have a top surface 146 and a bottom surface 148 coupled to chassis 102. Accessory platform 144 can have at least one mounting aperture 150 extending from top surface 146. It is fully contemplated mounting aperture 150 could be located anywhere on vehicle 100 such as chassis 102, the body of vehicle 100, and footrest 138 without departing from the spirit of the present teachings.

Figure 1B:
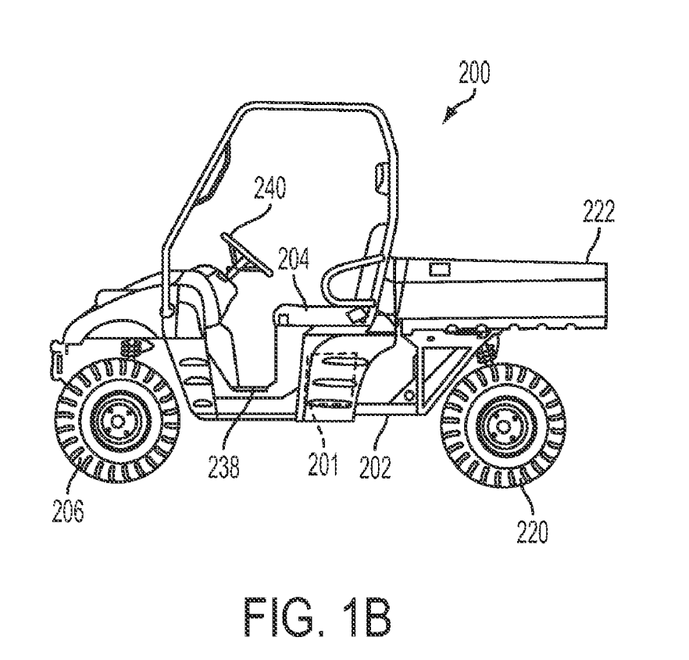
FIG. 1B shows a perspective view of a utility vehicle in an embodiment of the present teachings.

FIG. 1B is another perspective view of a vehicle in accordance with an embodiment of the present teachings. Vehicle 200 of FIG. 1B can be generally referred to as a utility vehicle. Vehicle 200 can have a chassis 202 carrying a bench type seat 204. In FIG. 1B, bench type seat 204 can be sufficiently wide to hold more than one vehicle rider. It is contemplated the embodiments for FIGS. 1A and 1B could have two seats, a seat large enough for two or more people to straddle, or side-by-side seating such as bucket style seats without departing from the spirit of the present teachings. Vehicle 200 can have a left front wheel 206, a right front wheel, a left rear wheel 220 and right rear wheel. In some embodiments, vehicle 200 could have tracks 123 similar to those shown in FIG. 1C. Vehicle 200 also includes an engine 201 that is carried by chassis 202. Engine 201 is preferably coupled to at least some wheels of vehicle 200 via a drive train for propelling vehicle 200. Engine 201 may be used to power any wheel on vehicle 200. It is fully contemplated that engine 201 could be a motor or any other apparatus to propel vehicle 200 without departing from the spirit of the present teachings.

Vehicle 200 can also include a footrest 238 that can be seen extending from one side of the chassis 202 to the other side. Vehicle 200 can also include at least one mounting aperture 226. For example, mounting aperture 226 can be located on accessory platform 222 often referred to as a box. Box 222 can extend from the rear of the chassis for carrying various items. Box 222 can have mounting apertures 226 similar to accessory platforms 142 and 144 located on the top of bed rail. It is further contemplated; box 222 could have mounting apertures located in bed 228, without departing from the spirit of the present teachings. Vehicle 200 can also include member 240 that may be used for steering vehicle 200. In the embodiment of FIG. 1B, steering member 240 comprises a steering wheel. Vehicle 200 can also have an accessory platform mounted to the front of the vehicle. It is fully contemplated mounting aperture 226 could be located anywhere on vehicle 200 such as chassis 202, the body of vehicle 200, and footrest 238 without departing from the spirit of the present teachings.

Figure 1D:
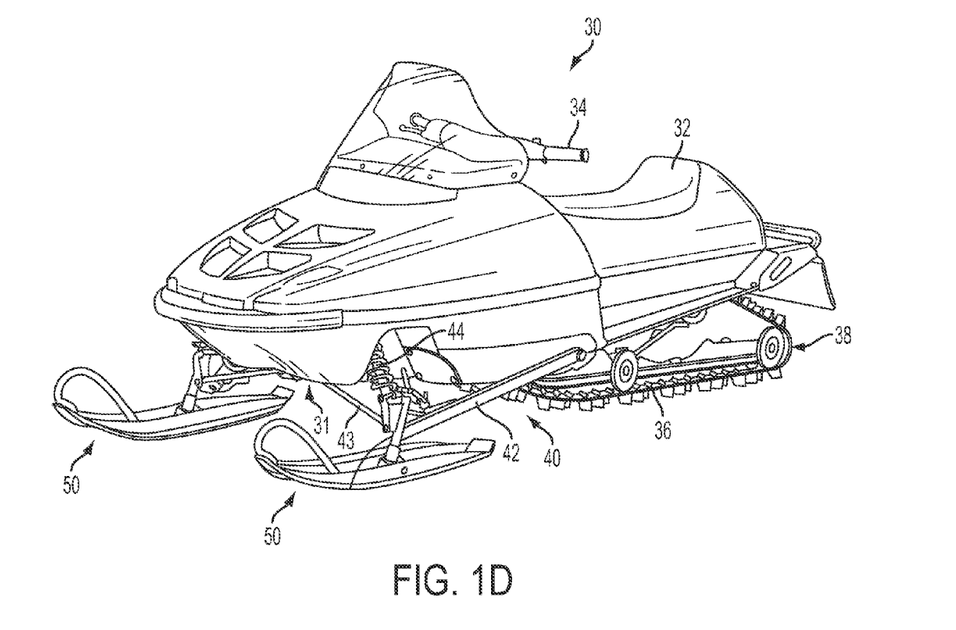
FIG. 1D shows a perspective view of a snowmobile that can incorporate some embodiments of the present teachings.

FIG. 1D depicts a snowmobile of the present teachings. The snowmobile includes a chassis 31, a straddle type seat 32 mounted to the chassis 31, and a pair of handlebars 34 carried by the chassis 31 adjacent to the seat 32 so that a rider sitting in straddle fashion on the seat may steer the snowmobile using the handlebars 34. The snowmobile includes an endless track 36 carried by a rear suspension system 38 mounted to the chassis 31, the endless track being connected to and powered by the snowmobile's engine 35 (typically located beneath the hood near the front of the snowmobile). A fuel tank may be located under seat 32.

Left and right steerable skis 50 are carried by a front suspension system 40, which in turn is mounted to the chassis 31. The suspension system may be of any suitable type. In the drawings a trailing arm suspension system is depicted, such a system utilizing, for each ski, a trailing arm 42 connected at its rear end to the chassis, a pair of generally transversely mounted radius rods 43 connected at their inner ends to the chassis and at their outer ends to the front end of the trailing arm, and a shock/spring combination 44 connected at one end to the chassis 31 and at the other end to the front end of the trailing arm 42. Other suitable suspensions could also be utilized, however, including, e.g., a double A-arm (sometimes called "double wishbone") suspension or a telescopic strut suspension.

Figure 1E:
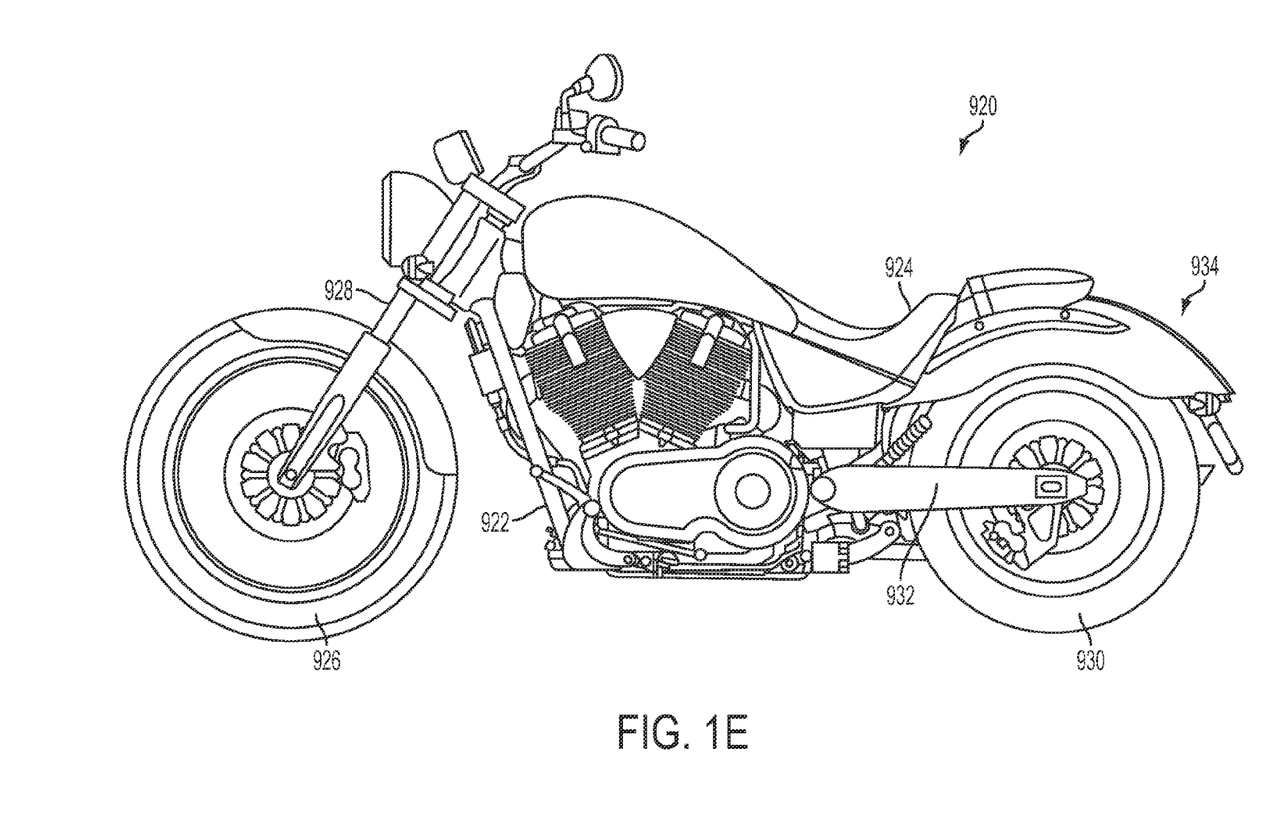
FIG. 1E shows a side view of a motorcycle that can incorporate some embodiments of the present teachings.

The motorcycle 920 illustrated in FIG. 1E includes a chassis 922, a seat 924 coupled to chassis 922, a front wheel 926 coupled to chassis 922 by a front fork 928, and a rear wheel 930 coupled to chassis 922 by a swing arm assembly 932. Steering member 942 can be used to steer wheel 926 or 930. A tail section 934 forms the rear portion of motorcycle 920 underneath seat 924 and above rear wheel 930. Engine 940 can be coupled to at least some of wheels 926 and 930 of motorcycle 920 for propelling motorcycle 920.

With reference to FIG. 2, a rear perspective view of an ATV having dual silencers in an embodiment of the present teachings is shown. As can be seen in this view, ATV 100 has two silencers (mufflers) 154 and 156 at rear 152 of ATV 100. As is discussed in more detail below, silencers 154 and 156 are common ATV silencers such as Sportsman 800 silencers manufactured by Polaris Industries. However, it is contemplated that silencers 154 and 156 could be any type of silencer without departing from the spirit of the teachings. While silencers 154 and 156 are shown at the rear of ATV 100, it is fully contemplated silencers 154 and 156 could extend anywhere (within safety concerns) from ATV 100.

Figure 3:
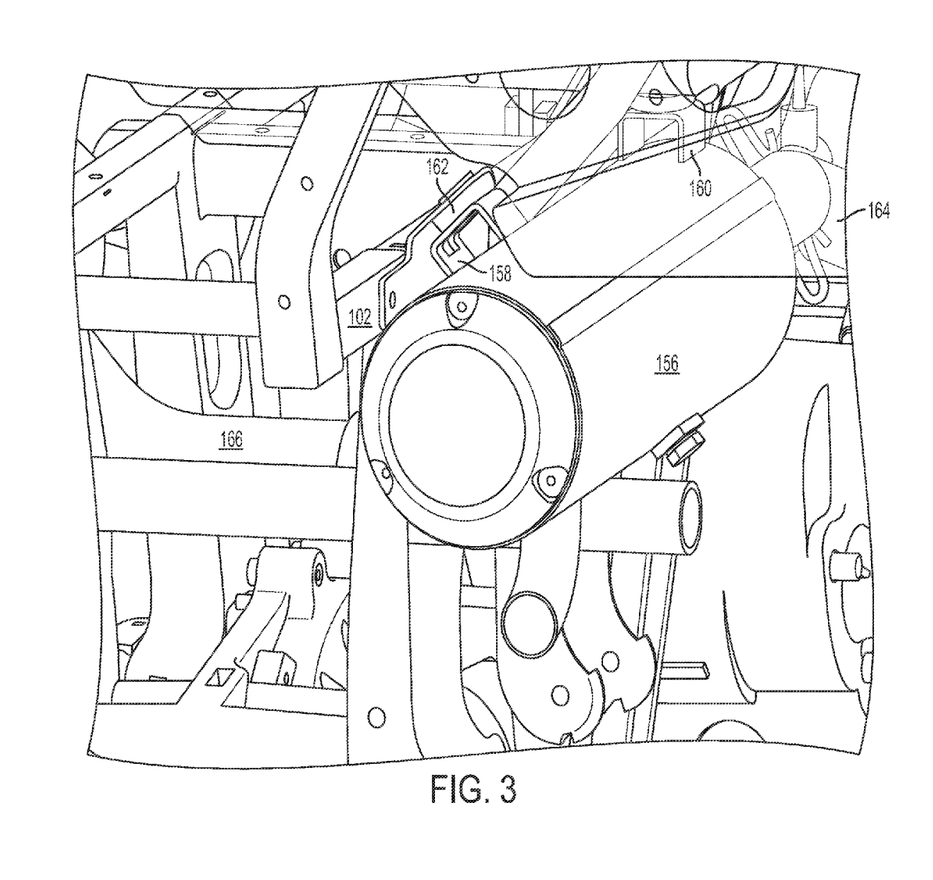
FIG. 3 shows a more detailed rear view of a silencer in an embodiment of the present teachings.

With reference to FIG. 3, a more detailed rear view of a silencer in an embodiment of the present teachings is shown. Silencers 154 and 156 are coupled to ATV 100 with brackets 158 and 160. Brackets 158 and 160 are coupled to chassis 102 with mounting screws and insulated from chassis 102 with shock mounts 162. In operation and discussed in more detail below, silencer 156 receives exhaust from engine 122 through exhaust pipe 164. Upon entering silencer 156 the exhaust can take two passage routes. The first is through silencer 156 and the second is through crossover tube 166 to silencer 154. This additional route assists in quickly dispersing the exhaust and thus reducing backpressure and increasing the vehicles performance.

Figure 4:
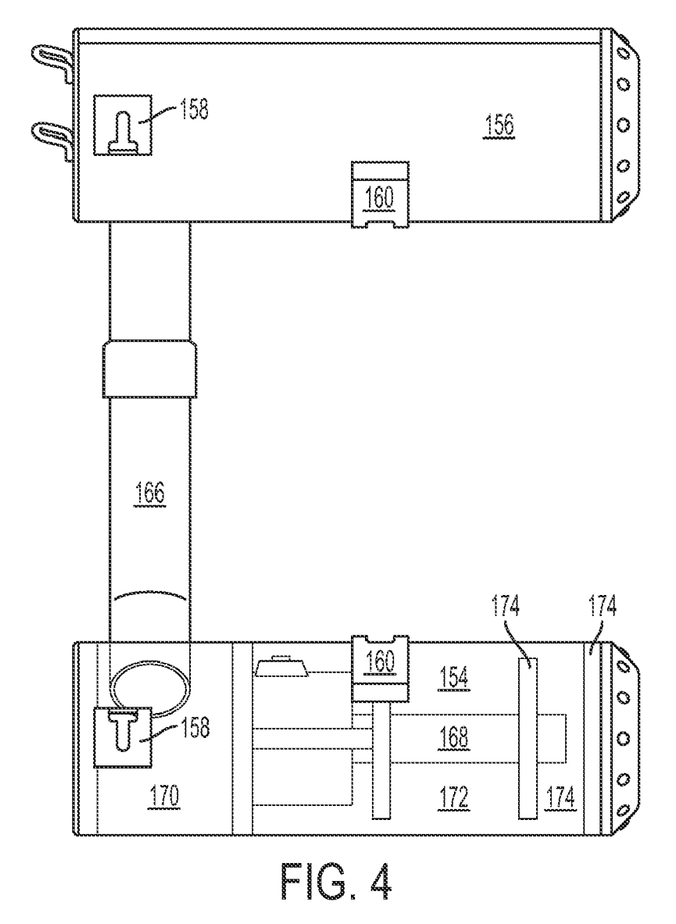
FIG. 4 shows a top profile view of dual silencers in an embodiment of the present teachings.

With reference to FIG. 4, a top profile view of dual silencers in an embodiment of the present teachings is shown. A chamber called a resonator 170 is connected to first chamber 172 by a hole. Resonator 170 contains a specific volume of air and has a specific length that is calculated to produce a wave that cancels out a certain frequency of sound. Located inside silencers 154 and 156 is a tube 168. Tube 168 is designed to create reflected waves that interfere with each other or cancel each other out. As discussed above, when the exhaust gasses enter resonator 170 of silencer 156 the some of the exhaust gas continues onto chamber 172 and some of the exhaust gas go into silencer 156 through crossover tube 166.

Figure 5:
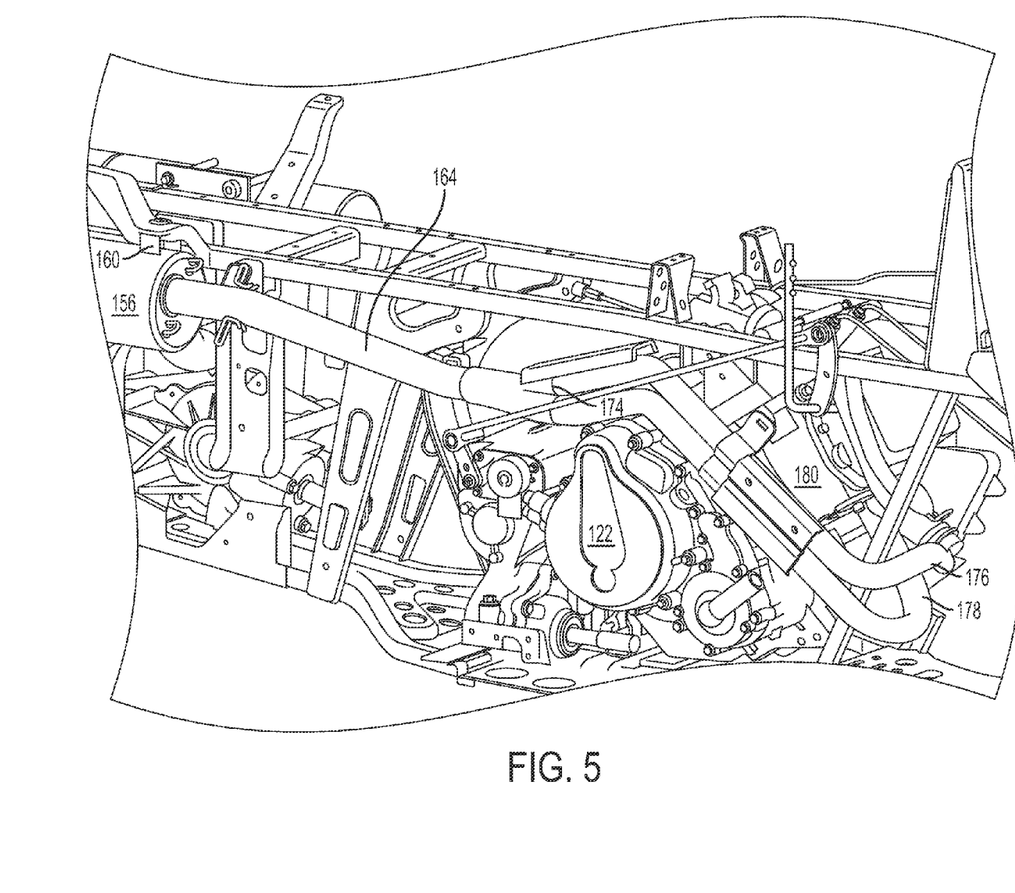
FIG. 5 shows a side profile view of a dual silencer and dual pipe system in an embodiment of the present teachings.
Figure 6:
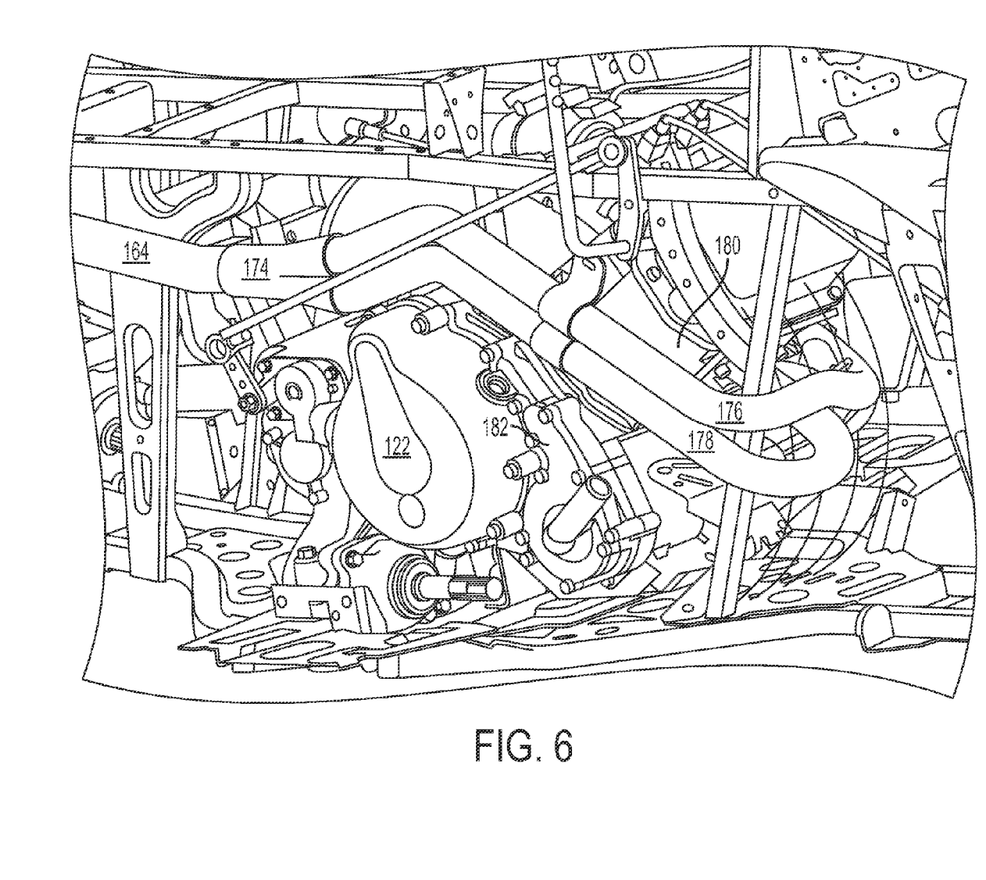
FIG. 6 shows a side profile view of a dual silencer and dual pipe system in an embodiment of the present teachings.

With reference to FIGS. 5 and 6, a side profile view of a dual silencer system and dual pipe system in an embodiment of the present teachings is shown. As discussed above, the exhaust gas enters silencer 156 through exhaust pipe 164. Exhaust pipe 164 is connected to 2-1 manifold 174, which combines the exhaust gasses from exhaust pipes 176 and 178. Exhaust pipes 176 and 178 are coupled to exhaust manifold 180 attached to engine 122.

Figure 7:
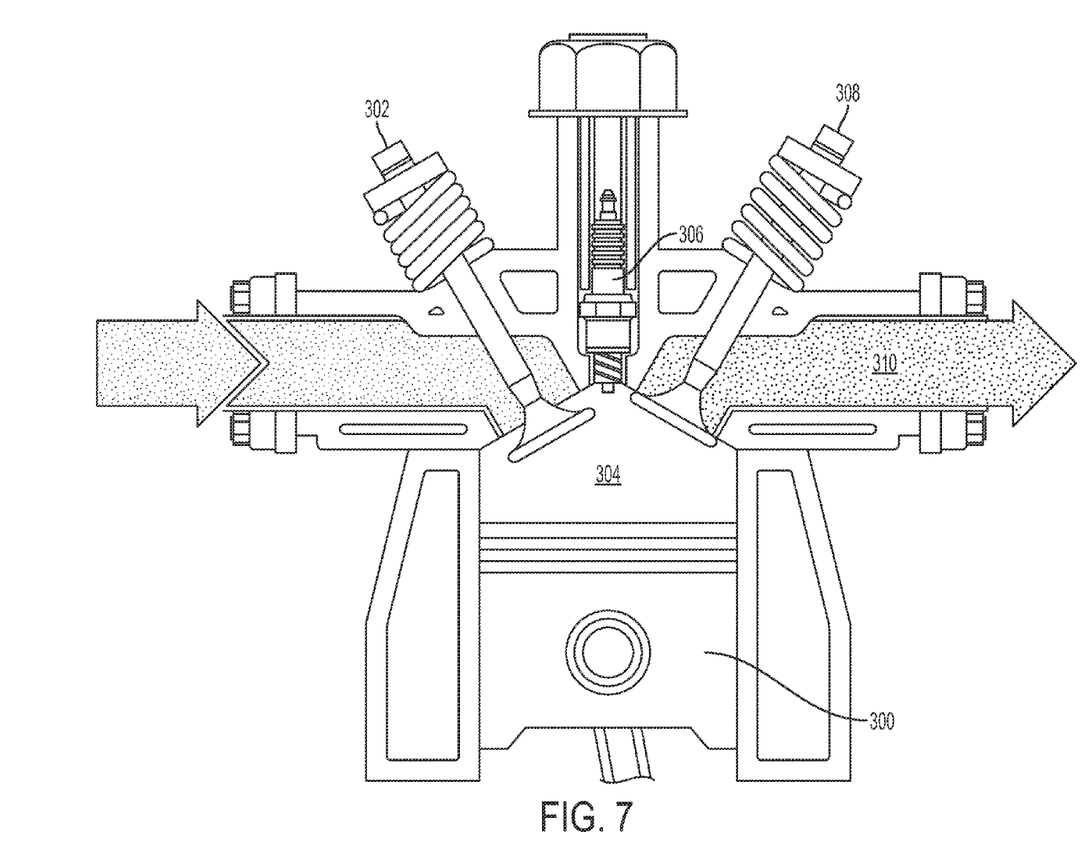
FIG. 7 shows a cutaway view of a four stroke engine in an embodiment of the present invention.

With respect to FIG. 7, a cutaway view of a four stroke engine in an embodiment of the present invention is shown. Piston 300 starts at top dead center, intake valve 302 opens, and piston 300 moves down to let the engine take in a combustion chamber 304-full of air and gasoline. This is the intake stroke. Then piston 300 moves back upward to compress this fuel/air mixture. When piston 300 reaches top dead center, spark plug 306 emits a spark to ignite the gasoline. The gasoline charge in combustion chamber 304, driving piston 300 downward. Once piston 300 hits the bottom of its stroke, exhaust valve 308 opens and the exhaust leaves combustion chamber 304 and enters exhaust manifold 180 and exhaust pipes 176 and 178. While the following discussion is directed towards a four stroke engine, it is fully contemplated the present teachings could be extended to any type of engine without departing from the spirit of the teachings.

As discussed above, it is desirable to have a rarefaction wave reach the exhaust valve while it is open. This low-pressure wave helps to empty the combustion chamber and also assist in filling the combustion chamber with a fresh incoming charge. It also reduces the amount of work piston 300 performs and thus reduces engine pumping losses. Of the four cycles, only the expansion cycle contributes to the power output of engine 122 by exerting force on the output shaft. The other three cycles actually reduce horsepower by resisting the rotating force. The intake and exhaust strokes create what is referred to as pumping losses. By having the rarefaction wave at the exhaust valve when opened the force required to pump the gasses from combustion chamber 304 is considerably reduced. The low-pressure wave also helps to reduce the residual mass fraction. That is, the low-pressure wave helps in evacuating the residual combustion products and the low density of the remainder results in a low residual mass fraction.

Figure 8:
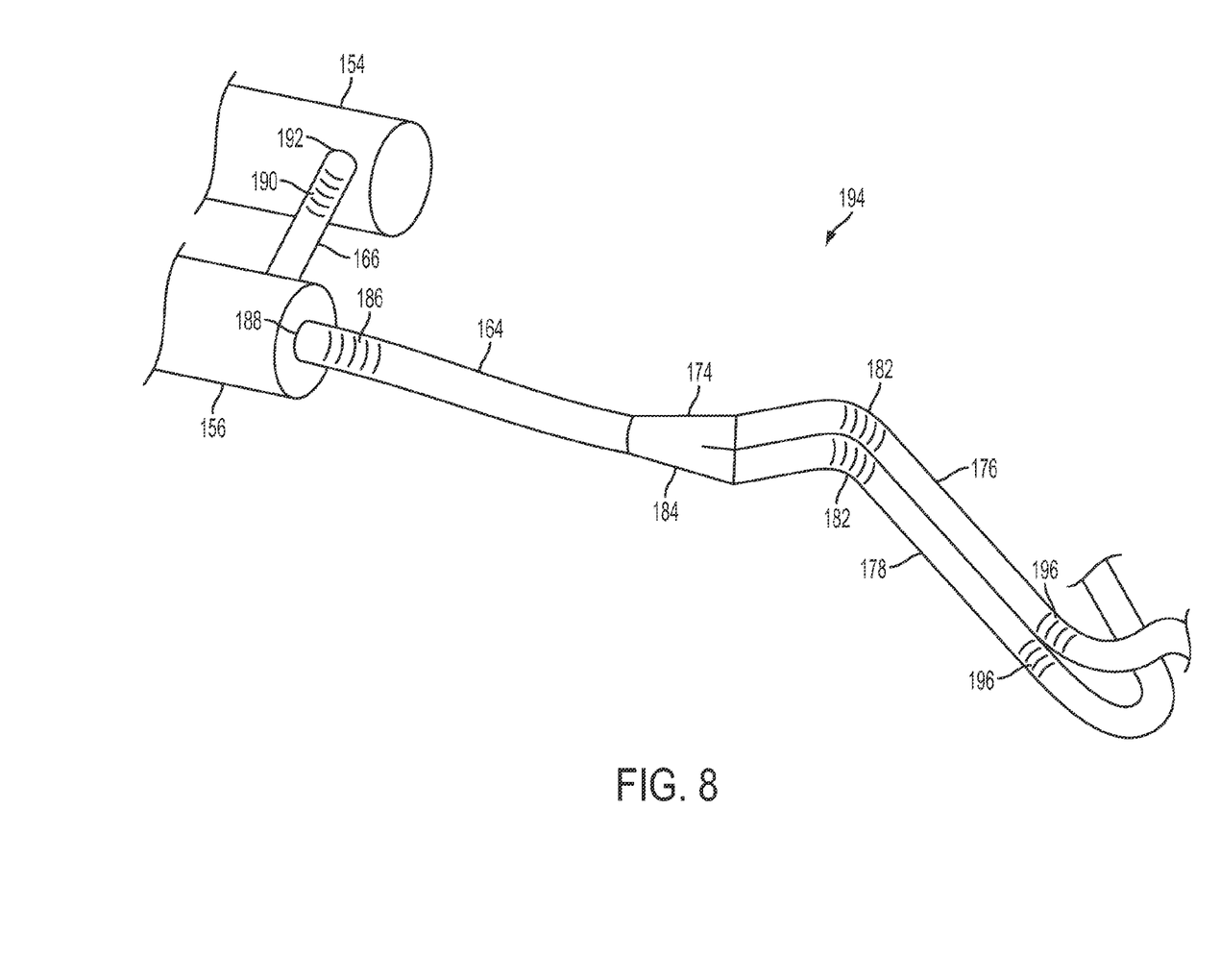
FIG. 8 shows a side profile of a dual silencer and dual pipe system in an embodiment of the present teachings.

With reference to FIG. 8, a side profile of a dual silencer system and dual pipe system in an embodiment of the present teachings is shown. The present teachings provide for multiple rarefaction waves to reduce engine pumping loss and/or residual mass fraction over a much larger range of the powerband. As discussed above, when the outbound energy wave encounters an increase in cross sectional area such as a second or larger diameter section of pipe, the muffler or the ambient atmosphere, a reversion wave (a reversed or mirrored wave) is reflected back toward the exhaust valve. The present teachings provide for multiple reversion waves to improve the torque curve over a broad rpm range. Partial benefits can be also derived from a single muffler on a dual pipe system or a dual muffler system on a single exhaust pipe. The two design features do not require the other to provide improved performance.

In operation, when the pressure wave travels through exhaust system 194 a first rarefaction wave 182 is created at junction 184 of exhaust pipe 164 and exhaust pipes 176 and 178. A second rarefaction wave 186 is created at junction 188 of exhaust pipe 164 and silencer 156. And, a third rarefaction wave 190 is created at junction 192 of exhaust pipe 166 and silencer 154. When exhaust valve 308 first opens piston 300 is near bottom dead center and there is high pressure in combustion chamber 304. A high-pressure wave 196 is sent down exhaust pipes 174 and 176 from valve 308. Every time wave 196 reaches an area of discontinuity such as junctions 184, 188, and 192 rarefaction waves 182, 186, and 190 are reflected back. When these waves reach valve 308 the low pressure helps evacuate combustion chamber 304 at the beginning of the exhaust cycle. This reduces the amount of work that piston 300 performs in getting the exhaust gas out. That happens at approximately 120 degrees after top dead center to maybe 120 degrees before top dead center.

Generally, the exhaust stroke takes only milliseconds. At 6,000 rpm one revolution is ten milliseconds and the exhaust stroke would be five milliseconds. In an embodiment having a cam shaft (not shown) with a particularly high amount of overlap causing intake valve 202 and exhaust valve 308 to both be open at certain periods, before piston 300 reaches top dead center, approximately 30 degrees before top dead center, exhaust valve 308 is still appreciably open and intake valve 302 is beginning to open. If there is high pressure in exhaust chamber 310, the high pressure will push exhaust right through intake valve 302. This causes dilution of the air fuel charge with exhaust. However, if there is a negative (low) pressure wave at exhaust valve 308 when both exhaust valve 308 and intake valve 302 are open, the low pressure would pull air/fuel intake into combustion chamber 304 and flushes exhaust out combustion chamber 304 of the residuals you know the exhaust. While some intake air may make it into exhaust port 310, which isn't necessarily desirable, however, a lower amount of exhaust that is left behind in combustion chamber 304 and this is very helpful in improving engine torque.

Figure 9:
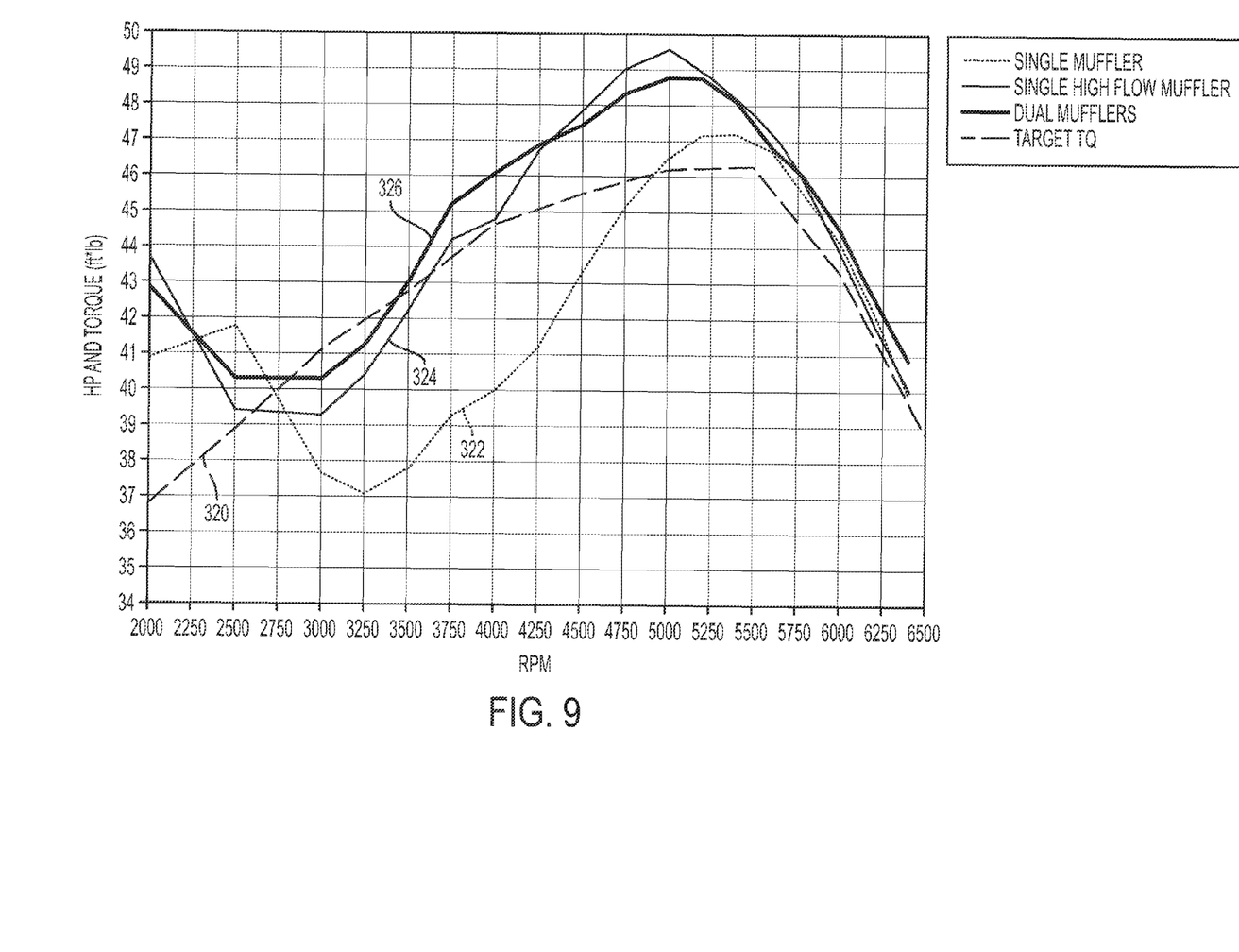
FIG. 9 shows a torque vs. RPM graph showing the performance of a dual muffler system on a single exhaust pipe versus other muffler systems in an embodiment of the present invention.

With reference to FIG. 9, a torque vs. RPM graph showing the performance of a dual muffler system on a single exhaust pipe versus other muffler systems is shown. As can be seen the result is a significant increase when going from the conventional single muffler to the higher flow single and another overall improvement when going to the similarly high flow dual muffler system. Having the same flow capability the dual muffler design differs from the high flow single due to the section of pipe connecting the two mufflers together. This length provides the separation of the rarefaction waves that provides the torque increase over a broad range at the expense of the small reduction in a narrow range.

Figure 10:
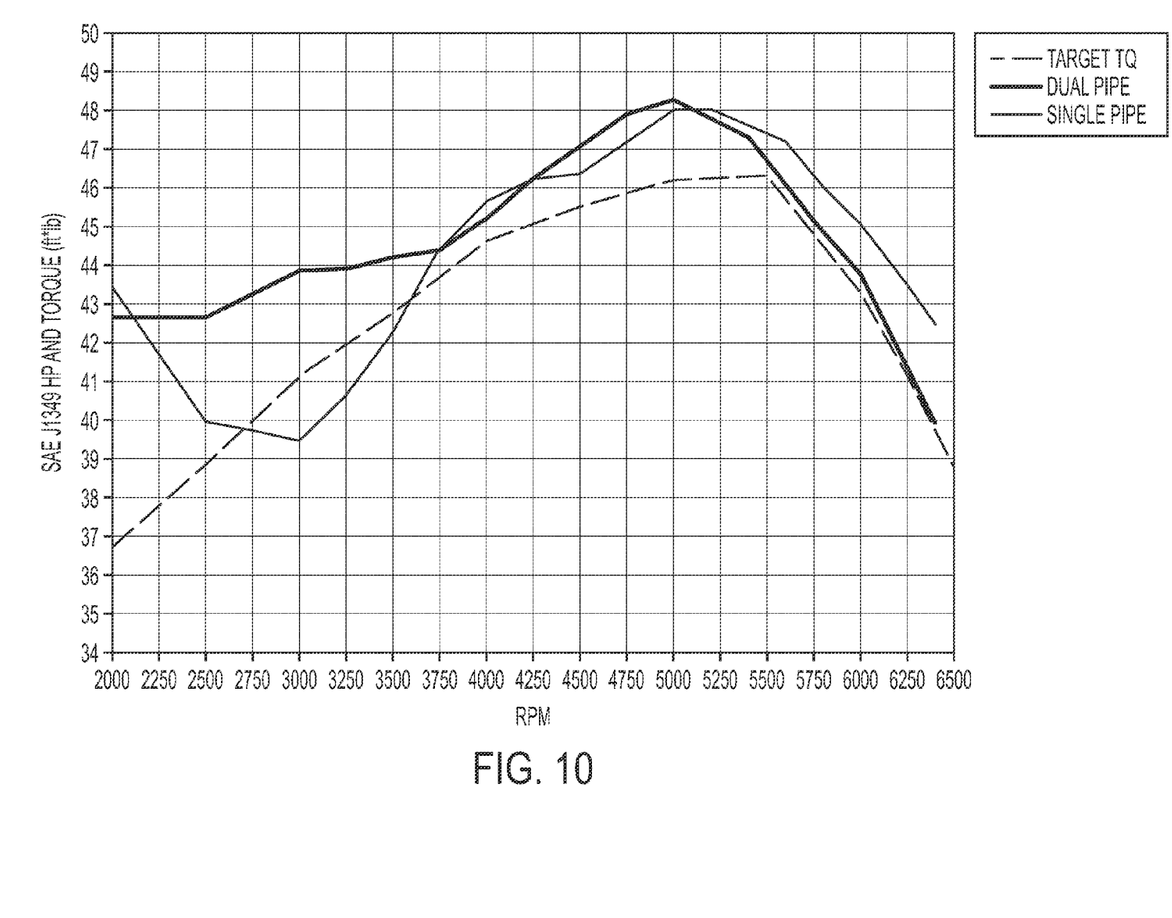
FIG. 10 shows a torque vs. RPM graph showing the performance of a dual pipe system compared to a single pipe system, both using the dual muffler system in an embodiment of the present invention.

With reference to FIG. 10, a torque vs. RPM graph showing the performance of a dual pipe system compared to a single pipe system, both using the dual muffler system. As can be seen the result is significant increases in performance in most rpm ranges, a small reduction in some ranges and an overall leveling of the torque curve.

As discussed above, a single silencer system provides a brief reflection wave. Thus, the scavenging effects would only be useful over a small rpm range. However, there is little added benefit of a large reflection wave versus a small reflection wave. And, as discussed already, it is harmful to have a positive wave which would cause problems with the intake charge leaving exhaust in combustion chamber 304 and thus increasing the residual mass fraction. Therefore, it is beneficial to provide a smaller rarefaction wave consistently over as broad a rpm range as possible. Further, this provides 80% of the benefit of a big vacuum wave but over a much broader rpm range.

With further reference to FIG. 9, the benefits of dual silencer system 194 can be shown. Dotted line 320 represents the target torque curve for the vehicle. Line 322 represents the torque curve for a single silencer system. Line 324 represents the torque curve for a single high flow silencer system Line 326 represents the torque curve for dual silencer system 194. As can be seen from torque curves 322 and 324 have a good torque response at higher rpms, however, at the lower rpms the torque response falls bellow target torque curve 320. The target torque curve is derived by the vehicle requirements and the desire to have a broad torque curve. Torque curve 326 of dual silencer system 194, however, is above or close to torque curve 320 at low rpms and exceeds torque curve 320 at the higher rpms. Thus as stated above FIG. 9 shows how dual silencer system provides an improved torque response curve over a much wider rpm range thus increasing the performance of the vehicle.

The length of exhaust pipes 176, 178, 164, and 166 is calculated using an equation based upon the vehicles powerband. This equation would be the peak power rpm divided into a constant to result in length in meters from the point of the junction or area expansion to the exhaust valve. For example, in the case of a dual pipe system on a multi cylinder engine the length from valve 308 to manifold 174 is approximately 1 meter or 6,000 rpm meters divided by 6,000 rpm (peak power rpm for this example). Therefore, exhaust pipes 176 and 178 would be approximately 1 meter. Taking into account other factors such as exhaust gas temperature the engine produces, it would depend somewhat on the diameters of pipes 176 and 178. The diameters that are chosen for pipes 176, 178, 164, and 166 will influence the length proportions a bit. Exhaust pipe 164 is calculated by dividing 8,500 rpm meters by 6,000 rpm providing a length of 1.4 meters measured back to the exhaust valves. This would make the length of pipe 164 approximately 400 millimeters or 1.4 meters less the 1 meter of pipes 176 and 178. Finally, Exhaust pipe 166 is calculated by dividing 11,500 rpm meters by 6,000 rpm to provide a length of 1.9 meters from the exhaust valve. Thus giving a length of approximately 500 millimeters for pipe 166. As may be appreciated from the aforementioned calculations, the constants of 6,000 rpm meters, 8,500 rpm meters, and 11,500 rpm meters are provided for the length to each junction 184, 188, and 192, respectively. The constants were determined experimentally and provide the torque curves shown in FIGS. 9 and 10. While the length of pipes 176, 178, 164, and 166 are discussed above with respect to the equation and a specific peak power rpm, it is fully contemplated that the peak power rpm can be any value for any vehicle and thus the lengths of pipes 176, 178, 164, and 166 can vary based upon the equation above without departing from the spirit of the invention.

Thus, embodiments of the ATV WITH DUAL SILENCERS are disclosed. One skilled in the art will appreciate that the present invention can be practiced with embodiments other than those disclosed. The disclosed embodiments are presented for purposes of illustration and not limitation, and the present invention is limited only by the claims that follow.

What is claimed is:

1. A vehicle having multiple silencers, comprising: a chassis carrying a seat; a steerable pair of front wheels and at least two rear wheels coupled to the chassis; a steering member for steering the front wheels; an engine carried by the chassis for powering the vehicle; at least one exhaust manifold operably coupled to the engine; at least one exhaust pipe coupled at one end to said at least one exhaust manifold; a first silencer coupled to the other end of the at least one exhaust pipe; a second silencer coupled in series to the first silencer to route exhaust from the at least one exhaust pipe through the length of at least one of the first silencer and the second silencer, wherein first and second distinct and substantially parallel first and second routes of travel are defined by the first and second silencers, the first route of travel causing exhaust gas to travel through the length of the first silencer and the second route of travel causing exhaust gas to travel through the length of the second silencer after first traveling through at least a portion of the first silencer the second silencer only indirectly coupled to the engine through the first silencer such that the second route of travel is the exclusive exhaust path through the second silencer; a crossover tube which couples the first silencer to the second silencer; the crossover tube is a predetermined length which creates a distinct exhaust rarefaction wave reflected from the second silencer; the rarefaction wave reflected from the second silencer is distinct from the rarefaction wave created by the first silencer; and the rarefaction waves from the first and second silencers travel back up the exhaust pipes and reduce engine pumping losses.

2. The vehicle of claim 1, wherein the first route of travel has a first length and the second route of travel has a second length, the second length the greater than the first length.

3. The vehicle of claim 1, wherein the second silencer is coupled at a rear portion to the first silencer at an intake portion by the crossover tube.

4. The vehicle of claim 1, wherein the length of the crossover tube is determined based upon a powerband of the engine by dividing peak power rpm into a constant.

5. An ATV having multiple silencers, comprising: a chassis carrying a saddle seat; right and left outboard front wheels and right and left outboard rear wheels coupled to the chassis; a steering member for steering the front wheels; an engine carried by the chassis for powering the vehicle; an exhaust manifold operably coupled to the engine; at least one exhaust pipe coupled at one end to said exhaust manifold; a first silencer including an intake portion coupled to the other end of said at least one exhaust pipe; a second silencer including an intake portion coupled to the intake portion of the first silencer for providing alternate substantially parallel first and second routes of travel for engine exhaust gas, the length of the second route of travel being greater than the length of the first route of travel, the second silencer only indirectly coupled to the engine through the first silencer by way of the second route of travel, the second route of travel being the exclusive exhaust path through the second silencer; a crossover tube which couples the first silencer to the second silencer; the crossover tube is a predetermined length which creates a distinct exhaust rarefaction wave reflected from the second silencer; the rarefaction wave reflected from the second silencer is distinct from the rarefaction wave created by the first silencer; and the rarefaction waves from the first and second silencers travel back up the exhaust pipes and reduce engine-pumping losses.

6. The ATV of claim 1, wherein a portion of the exhaust gas travels the length of the first and second silencer.

7. The ATV of claim 5, wherein the length of the exhaust pipes can be set to reduce engine pumping loss at a desired RPMs.

8. The vehicle of claim 5, wherein the length of the crossover tube is determined based upon a powerband of the engine by dividing peak power rpm into a constant.

9. A vehicle having multiple silencers, comprising: a chassis carrying a saddle seat; right and left outboard front wheels and right and left outboard rear wheels coupled to the chassis; a steering member for steering the front wheels; an engine carried by the chassis for powering the vehicle; an exhaust manifold operably coupled to the engine; at least one exhaust pipe coupled at one end to said exhaust manifold; a first silencer coupled to the other end of the exhaust pipe; a second silencer coupled at a rear portion to the first silencer at an intake portion by a crossover tube, wherein a first portion of the exhaust gas travels the length of the first silencer to atmosphere; the crossover tube allows a second portion of the exhaust gas to travel the length of the second silencer to atmosphere, providing distinct and substantially parallel first and second routes of travel for the first and second portions of the engine exhaust gas through the first and second silencers, the second route of travel causing the second portion of the exhaust gas to travel through the length of the second silencer after first traveling through at least a portion of the first silencer the second silencer only indirectly coupled to the engine through the first silencer such that the second route of travel is the exclusive exhaust path through the second silencer; a portion of the exhaust gas travels the length of the first and second silencer; a rarefaction wave reflected from the second silencer is distinct from a rarefaction wave created by the first silencer; and the rarefaction waves from the first and second silencers travel back up the exhaust pipes and reduce engine-pumping losses at predetermined RPMs.

10. The vehicle of claim 9, wherein the crossover tube has a length which creates a distinct exhaust refraction wave reflected from the second silencer, the length of the crossover tube being determined based upon a powerband of the engine by dividing peak power rpm into a constant.

* * * * *